April 21, 1959  R. M. BOWIE  2,883,659
TIMING AND PHASE-CONTROL CIRCUITS
Filed March 18, 1942  4 Sheets-Sheet 1

ROBERT M. BOWIE
INVENTOR

BY *John J. Rogan*
ATTORNEY

April 21, 1959  R. M. BOWIE  2,883,659
TIMING AND PHASE-CONTROL CIRCUITS
Filed March 18, 1942  4 Sheets-Sheet 2
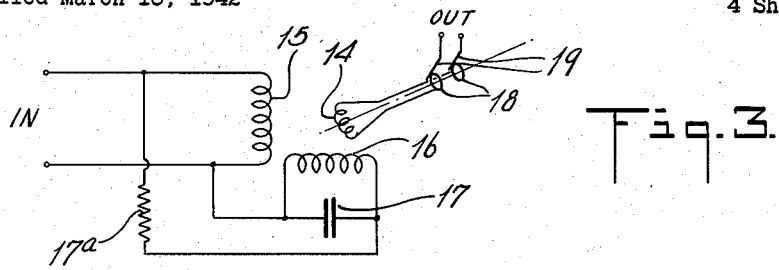
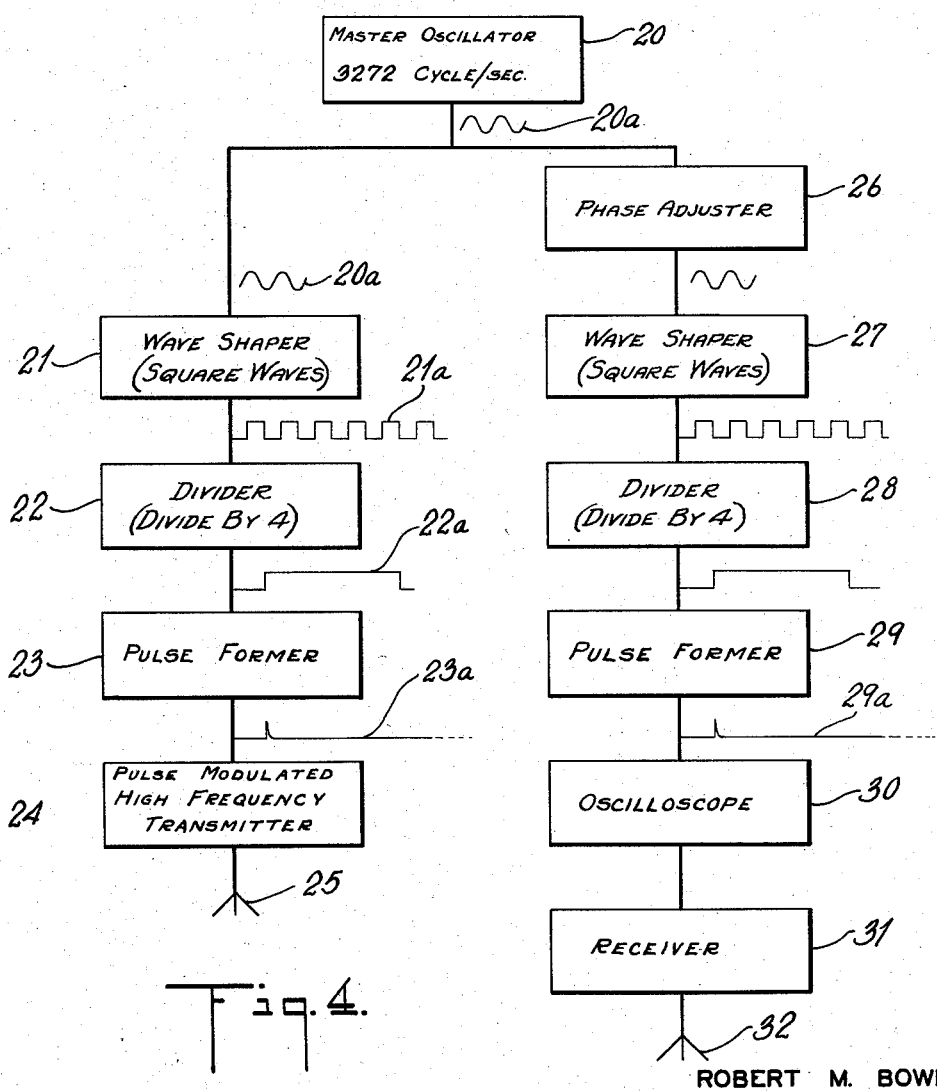
ROBERT M. BOWIE
INVENTOR
BY John J. Rogan
ATTORNEY

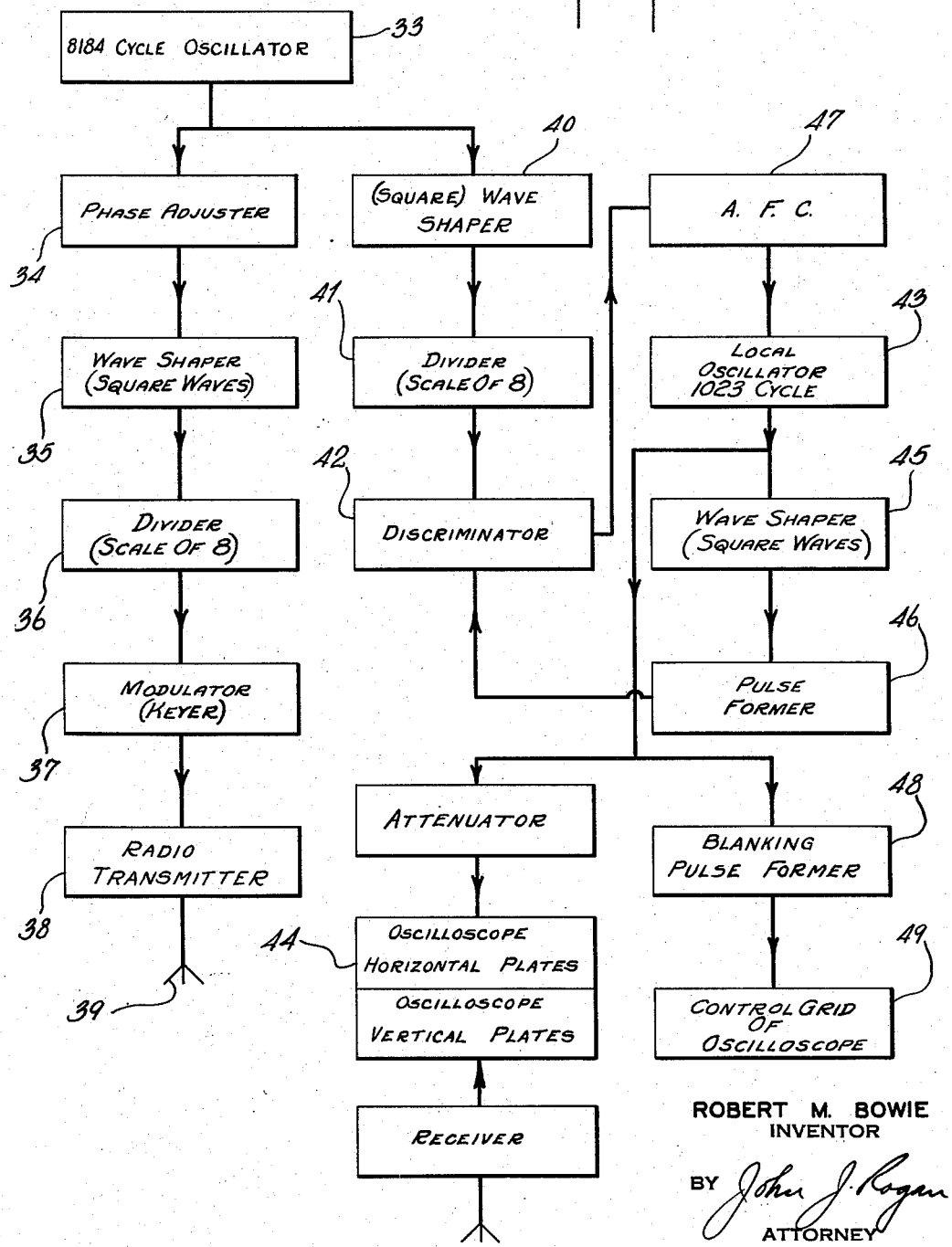

United States Patent Office 2,883,659
Patented Apr. 21, 1959

2,883,659

TIMING AND PHASE-CONTROL CIRCUITS

Robert M. Bowie, Emporium, Pa., assignor to Sylvania Electric Products Inc., a corporation of Massachusetts Application March 18, 1942, Serial No. 435,157

25 Claims. (Cl. 343—13)

This invention refers to phase-difference determining devices for the determination of the phase or time of arrival existing between two signals derived from the same source but transmitted over separate paths along which the times of transmission may be unequal.

It is the principal object of this invention to provide means for increasing the accuracy of the determination of the phase difference or time of arrival between the two signals as described above. Accordingly, the method and apparatus described hereafter are of great value when applied to radio goniometers, radio altimeters, radio locators and the like.

In radio goniometers or locators the distance from an object is usually determined from the radio echo time and may be measured as the phase difference between the transmitted and the reflected signal. In some instances the transmitted signal is a continuous radio frequency wave. In other cases, it may be a signal which is applied either as amplitude or frequency modulation upon a radio frequency carrier.

The phase difference between the two signals may be determined by introducing a known compensating time delay or phase shift into one of the paths such that some comparing device indicates exact synchronism between the two signals. This is a null method. It is also possible to determine the phase difference or a time delay directly or indirectly.

The accuracy of a radio locator and the like employing the null method may be limited by (1) the accuracy of synchronization determination, (2) phase shift drifts in the electrical circuits after the zero of the instrument has been set, and (3) the inaccuracy of the compensating phase shift device. The inaccuracy due to the first can usually be made small.

It is one of the features of this invention to eliminate one source of phase shift drift.

The accuracy of the compensative phase shift device is usually substantially constant for a given type. For a given type, the tolerance may be expressed in terms of a small angle which is independent of the frequency for which the device is designed. From this it is clear that as the frequency is increased the error measured in time, not in phase, varies inversely. When the device to which this invention is being applied is a radio locator, the absolute accuracy of its range improves with increasing signal frequency.

If it is desired to operate the locator at such a signal frequency that no ambiguity can exist relative to the reflected signal over the range of usefulness of the locator, then the signal period must be at least great enough so that the radio energy can leave the transmitter, be reflected and return to the receiver in less than one period. The base range of such an instrument can be defined as the distance to which radio energy can be transmitted and reflected back in the time exactly equal to one period. In locators of this type, therefore, it is obvious that an improvement in accuracy is associated with a decrease in the base range and vice versa.

A feature of this invention is, therefore, to provide means by which the accuracy of the compensating phase shift device can be improved without necessarily changing the signal frequency.

A feature of my invention is the provision of a master oscillator which controls the compensating phase shift device at a frequency higher than the signal frequency.

Another feature of my invention is the use of a master oscillator which operates at a multiple of the signal frequency.

According to an object of the invention, the frequency of the scanning oscillator is controlled by a discriminator on which the output of a frequency subdivider is impressed.

One feature of the invention refers to the control of two frequency subdivider circuits by a master oscillator.

Another feature of the invention refers to means for obtaining two signals of different phases from a master oscillator, and subsequently subdividing the frequency of the two signals (differing in phase) to the same or different lower frequencies in the two respective circuit branches.

A feature refers to the application of pulse formers to one or more signals derived directly or indirectly from a master oscillator, before these signals are subdivided by frequency dividing circuits.

Another feature refers to the formation of pulses from two signals derived from a common master oscillator, after the signals have been scaled down to a frequency lower than the frequency of the master oscillator.

It is another object of the invention to provide a radio locator whose accuracy is at least as high as the accuracy of the goniometers used for fire control of anti-aircraft guns.

Finally, it is an object of the invention to provide an impulse type radio locator of extremely high accuracy even at high aboslute values of spurious noise signals.

My invention will now be described in connection with the drawing, in which

Fig. 1 is a block diagram of a typical impulse type locator.

Figs. 2 and 3 represent two types of phase shifting circuits that may be used in practising the invention.

Figs. 4, 5, 6 are block diagrams of different embodiments of my invention.

Figures 1, 2:
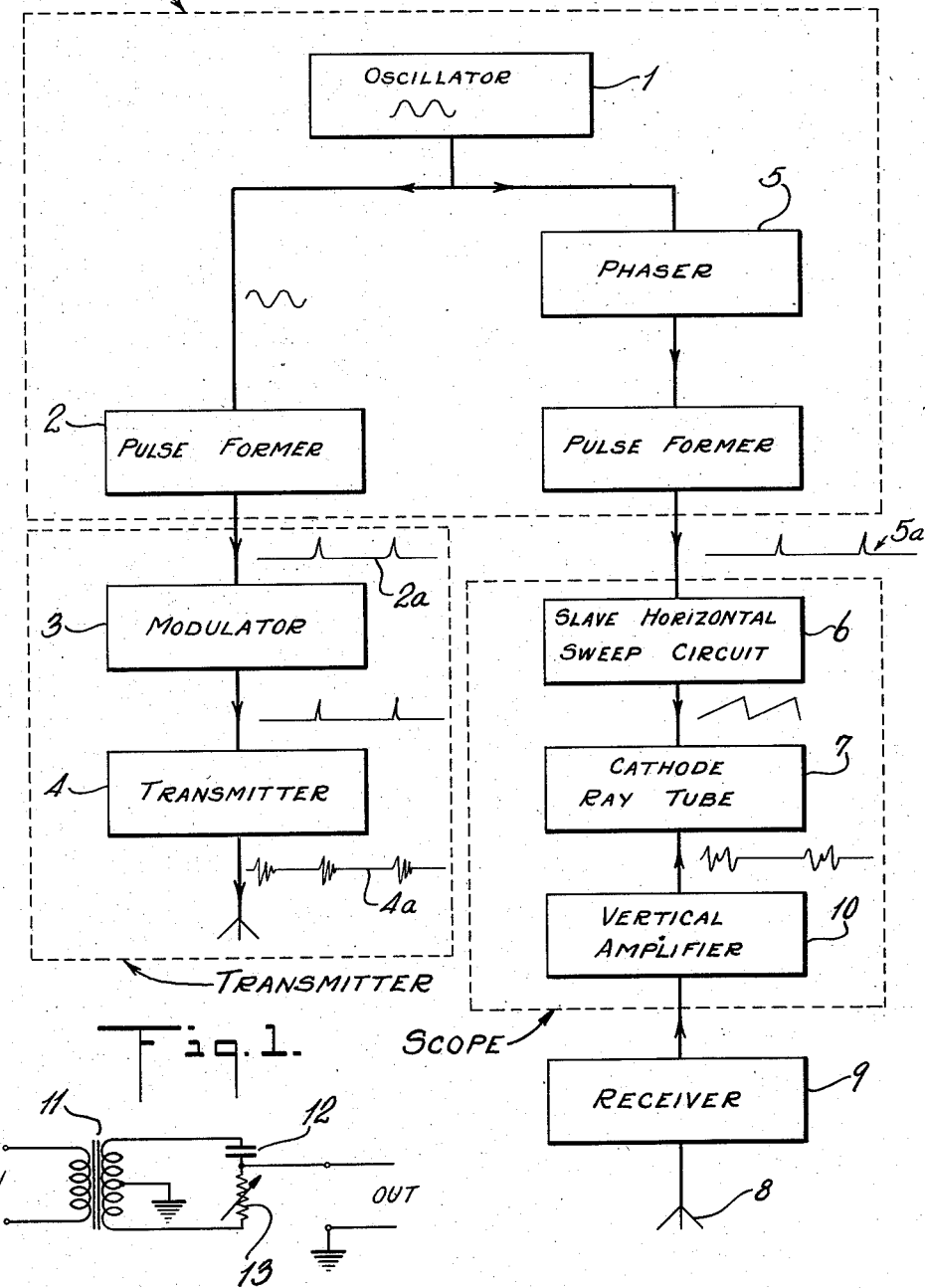

The block diagram of Fig. 1 represents a typical impulse locator. It consists of four major parts; the timer, the transmitter, the oscilloscope and the receiver as indicated in the drawing. In the timer, a master oscillation which is usually sinusoidal is developed by the oscillator 1. A portion of the oscillator output is fed to a pulse forming circuit 2 which may produce pulses of the type shown by curve 2a. These pulses then key the modulator 3 which in turn causes the transmitter 4 to send out short bursts of radio energy as indicated by curve 4a. Returning again to the master oscillator, note that a portion of the output is also fed to a phaser 5 which may be any type of circuit which will introduce a controlled phase shift between its input and output. The output of the phaser is then formed into pulses 5a which are used to control circuit 6 for the generation of the horizontal sweep voltage for the cathode-ray tube 7. The reflected radio energy is picked up by the antenna 8 and is impressed on the receiver 9. The detected signals, after amplification in amplifier 10, are fed to the vertical plates of the cathode-ray tube and appear on the screen as vertical lines rising above a horizontal line. Each vertical line is characteristic of some object from which the radio energy is being reflected.

Any one of a number of phase shifting circuits may be employed for the phaser 5. Fig. 2 shows an arrangement which permits a 180 degree phase shift, and comprises a phase-shifting network consisting of the input transformer 11 which is shunted by a condenser 12 in series with adjustable resistor 13. The output terminals are connected between the condenser and resistor and through ground to the midpoint of the secondary winding of transformer 11. The phase shifter of Fig. 3 is frequently referred to as an electrical goniometer. With it, a phase shift of 360 degrees is obtained for every revolution of the pick-up coil 14. The master oscillation, in the form of a sine wave, is fed directly to coil 15 which we shall assume to be entirely inductive. In it, therefore, the current lags the voltage by 90 degrees as does the resulting magnetic field. Coil 15 is in the form of a Helmholtz coil symmetrically placed about the pick-up coil 14 and perpendicular to coil 15 is another Helmholtz coil 16. The latter is caused to resonate by the capacity 17 so that together they present a purely resistive impedance to the line. Hence, the magnetic field in coil 16 is 90 degrees out of phase with that produced by coil 15. By means of resistance 17a the amplitudes of the two magnetic fields are made to be equal at coil 14. Together the coils 15 and 16 produce in the vicinity of coil 14, a magnetic field which rotates at the master oscillator frequency. The phase of the voltage induced in 14 is determined entirely by the angle at which it is oriented with respect to coils 15 and 16. This angle is controlled by means of a calibrated dial. The coil 14 is connected to the output terminals through suitable slip rings and brushes 18, 19.

The range of an object is determined by the phase difference between the reflected and transmitted signal caused by the radio echo time. Calling $r$ the distance of the object to be located from the transmitting point, $n$ the impulse frequency, this phase difference is $$P = \frac{360 \times 2r \times n}{c}$$

where $c$ is the velocity of propagation, which may be taken as the velocity of light. The base range is taken as the maximum range for which unambiguous echos are obtained. This corresponds to $P_{max} = 360$ degrees. Locators are, at present, capable of detecting planes or similar craft at a distance of 30 to 35,000 yards and a base range at least that great is, therefore, desirable. For the purposes of gun laying, it is desirable to know the range with an accuracy of approximately 100 yards or better. This corresponds to an angle on the goniometer of 54 minutes, which appears to be approximately the limit of accuracy set by the goniometer itself.

It is desirable to increase as far as possible the peak power transmitted because this increases the amplitude of the reflected signal, and the resulting vertical line on the oscilloscope is then easier to distinguish from spurious noise. With the present transmitting tubes, it appears that higher peak pulse power can be obtained only by reducing the pulsing frequency. This, however, increases the base range and hence the tolerance. To overcome this difficulty, therefore, it is proposed to operate the phaser at a frequency an integral number of times greater than the pulsing frequency. The error of the phaser is reduced below that to be expected from the pulsing frequency by the said integral number. As the choice of the integer is arbitrary, either peak power transmitted or the accuracy of the phaser or both may be improved. Such an arrangement is shown in Fig. 4.

The advantages gained by the use of the higher frequency master oscillator must not, however, be lost by the frequency dividing circuits. I have found that high accuracy can best be retained by deriving from the sinusoidal wave 20a from the master oscillator 20 another wave of equal frequency but with very steep wave fronts. Any well-known wave shaper 21 may be used. Such a square wave 21a is shown in Fig. 4. I have found that best results are obtained with divider circuits which change their states of conduction suddenly and substantially coincidentally with the receipt of a steep wave front. As examples of such dividers may be mentioned multi-vibrator electron tube oscillators, a blocking tube oscillator e.g., a self-quenching oscillator such as a so-called super-regenerator, or a "scale of 8" such as described by Lifschutz in Review of Scientific Instruments, volume 9, page 83 (March 1938). Some of these divider circuits have output wave forms which are themselves square waves of lower frequency than their input waves, while others give output signals which are in the form of sharp pulses such as illustrated in curve 2a (Fig. 1). Either a square top wave or the sharp pulse type of signal can be satisfactorily used to control the horizontal sweep circuit of the oscilloscope 30 while the sharp pulse type signal is preferable for controlling the modulator of the transmitter 38.

As shown in Fig. 4, the square-topped waves 21a from device 21 are impressed upon the divider 22 to produce a series of square-topped waves 22a of a regular frequency which is a submultiple of the frequency of waves 21a, the multiple being an integral number. Thus the frequency of waves 22a may be ¼ the frequency of waves 21a. The waves 22a are then impressed upon any well-known pulse former 23 to produce sharp pulses 23a corresponding to the leading or trailing edges of each wave corresponding to 22a. Pulses 23a modulate the high frequency transmitter 24 to excite the directional antenna 25. Likewise, the master oscillator waves are passed through the calibrated phase adjuster 26 and hence through a wave shaper 27 similar to 21; thence through a divider 28 similar to 22; thence through a pulse former 29 similar to 23. The pulses 29a from device 29 control the horizontal sweep of the cathode-ray beam in oscilloscope 30, while the vertical sweep of the oscilloscope is controlled by the signals form the antenna 25 as they are reflected from the object and are picked up by antenna 32 and detected and amplified in the radio receiver 31.

It is not essential that both divider circuits divide by the same integer. It is possible for instance, to cause the divider 22 to divide by 8 while the divider 28 continues to divide by 4. When so operated, the spot on the cathode-ray screen scans twice horizontally for each pulse transmitted from antenna 25. To eliminate the effect of the double scan, one of them can be blanked out by a suitable blanking pulse.

Horizontal sweep circuits are customarily synchronized at the time when the scan is started. This is true of the "slave horizontal sweep circuit" shown in Fig. 1. As the index line is usually located at the center of the screen, the instant at which the spot passes the index line is determined by two things, one, the phase shift introduced by the phaser and, two, the time required for the horizontal scan to leave the point of initiation and to reach the index line. This latter time is usually assumed to be constant and is compensated for by the initial adjustment of the phaser. Where it is desired to avoid the possibility of errors arising from this scanning process, the arrangement shown in Fig. 5 may be employed. This diagram is identical in principle with that of Fig. 4 down to the discriminator 42. The sinusoidal oscillations from master oscillator 33 are passed through a calibrated phase adjuster 34; thence through a wave shaper 35 to form substantially square-topped waves; thence through a "scale of 8" divider 36 whereby they are reduced in frequency by one-eighth. The output of device 36 controls the keying of modulator 37 which in turn controls the high frequency transmitter 38 and its radiating antenna 39. A portion of the master oscillations is also applied to another wave shaper 40 similar to wave shaper 35; thence to a "scale of 8" divider 41 similar to device 36. The output of device 41 controls in part a discriminator 42 which may be any well-known circuit arrangement for comparing the phase of pulse output of device 41 with the phase of the pulse output derived from the local oscillator 43 which oscillator drives the horizontal scanning plates 44 of the oscilloscope. The frequency of oscillator 43 is kept in close phase synchronism with the frequency of the signals from the device 41 by impressing a portion of the output of oscillator 43 on a wave shaper 45 similar to 40; thence from device 45 through a pulse former 46 similar to device 2 (Fig. 1). These pulses are applied to the discriminator 42 where they are compared with the pulses from device 41. The resultant control signal from device 42 is determined by the phase relationship between the two signals from devices 41 and 46, and this resultant is applied to an automatic frequency control circuit (A.F.C.) 47 of any type well-known in the radio receiver art, so that the frequency of oscillator 43 is caused to increase if the pulse from device 46 lags behind the pulse from device 41 and caused to decrease if the pulse from device 46 is leading.

In this embodiment, high amplitude sinusoidal scanning is employed on the oscilloscope so that approximately only ⅛ of the total scanning trace appears on the oscilloscope screen. At the same time, it is necessary to derive blanking impulses to extinguish the return trace resulting from the double scanning as above mentioned. For this purpose, a portion of the output of oscillator 43 is applied to a "blanking pulse former" 48 whose output is applied to a control grid 49 forming part of the oscilloscope. The pulse from device 48 is timed with respect to the pulses applied to the horizontal scanning plates so that it blanks out the return trace of the scanning beam in the manner well understood in the oscilloscope art. It is important to note that the synchronization of the oscillator 43 with the "scale of 8" device 41 occurs at the instant when the scanning spot is passing the center of the oscilloscope screen where the index is located.

While the foregoing description has been based upon a null method of comparison between the transmitted signal waves and the reflected waves, it will be clear that a direct indicating method may be used. Thus the phaser 26 (Fig. 4) can be set so that the vertical trace resulting from the direct transmission of the radio frequency pulse from 25 to 32 appears on the left side of the oscilloscope screen. If this vertical trace is made coincident with a zero line on a prearranged calibrated scale, the range of any object producing a vertical line on the oscillograph screen may be read directly from the scale. Thus the radio echo time is indicated directly on the screen and scale.

Figure 6:
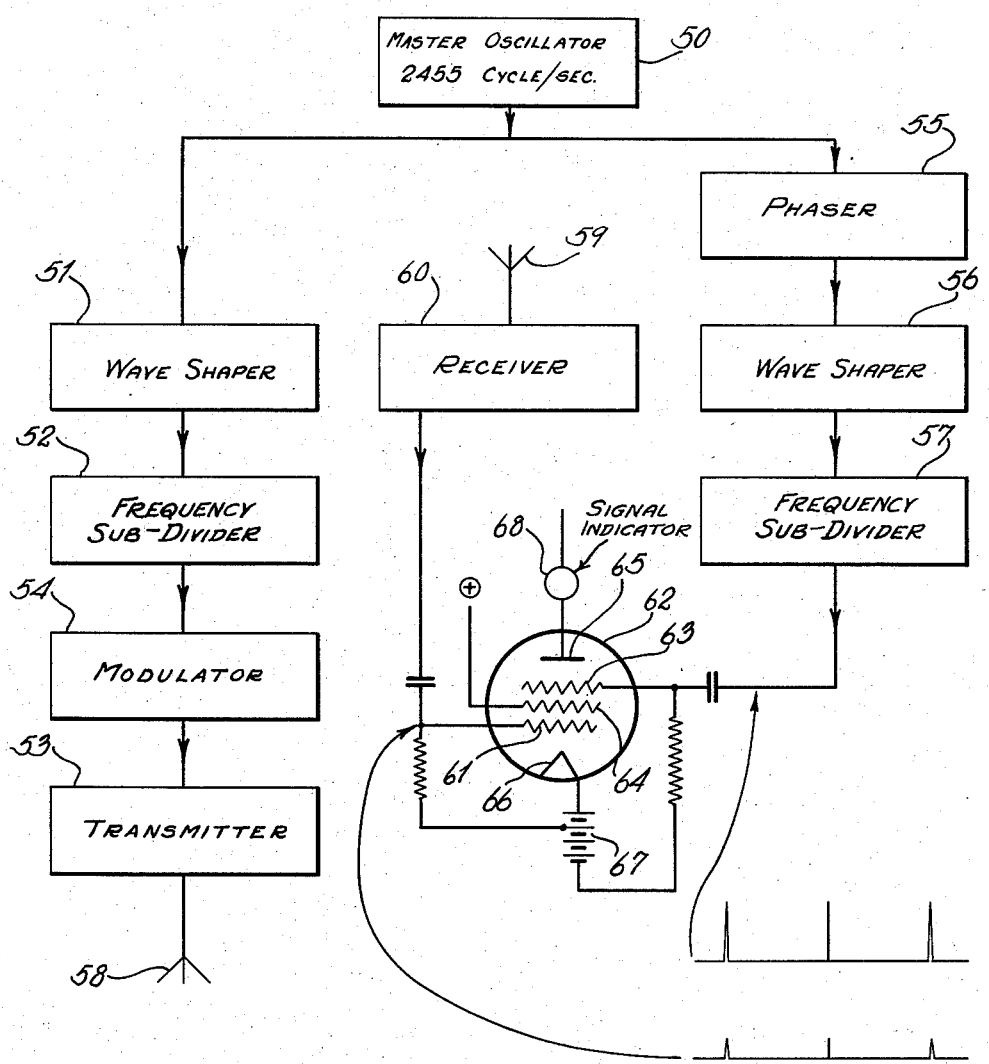

It will be understood that types of indicators other than cathode-ray oscilloscopes may be employed. One such typical arrangement is illustrated in Fig. 6 wherein the oscillations from the master oscillator 50 are applied through a square wave shaper 51 and a frequency subdivider 52 similar to the devices 21 and 22 (Fig. 4), the subdivided oscillations being applied to key the radio frequency transmitter 53 through a keyer or modulator 54. Another portion of the master oscillations are applied to the adjustable phaser 55 and thence through a square wave shaper 56 similar to device 51 and through the frequency subdivider 57. The radio frequency pulses radiated from antenna 58 to the object and reflected to the pick-up antenna 59 are detected by the radio receiver 60. These pulses are impressed upon the control grid 61 of a pentode tube 62. The impulses from the device 57 are impressed upon the suppressor grid 63. The shield grid 64 is in the well-known manner connected to a positive tap on the D.C. power supply source for tube 62 so as to be at a potential lower than the anode 65. The control grid 61 and the suppressor grid 63 are appropriately negatively biased with respect to the cathode 66 by means of the battery 67. The normal potential impressed upon the grids 61 and 63 is such that the tube 62 is biased to plate current cutoff. However, when pulses from device 57 are impressed upon suppressor grid 63, the tube 62 is rendered conductive so far as the suppressor is concerned for the duration of each of the pulses from device 57. If the reflected waves picked up by antenna 59 are impressed upon the control grid 61, then current flows in the plate circuit of the tube 62 only when the pulses picked up by the antenna 59 are coincident with the pulses from device 57. This coincidence of the pulses can be adjusted by means of the phaser 55. The flow of current in the plate circuit of tube 62 can be indicated in any one of several ways. Thus an indicator 68 may be connected in the plate circuit of the tube. This indicator may be either a neon lamp or a micro-ammeter shunted by a capacitor. If the keying frequency at the modulator 54 is an audible frequency, the indicator 68 may be replaced by an audible reproducer such as ear phones or the like. Although, for illustrative purposes, I have used arrangements in which but one transmitting and one receiving antenna are used, it is to be understood that my invention has broader application and may be used, for instance, in connection with types of radio locators employing double tracking. In such arrangements, it is customary to employ directional antennae for both reception and transmission. In some cases, two receiving antennae are employed, one set at a slight angle to the right and the other at a slight angle to the left of the transmitter antenna. A pulse of radio energy is transmitted from the transmitting antenna and received on one of the receiving antennae. Another pulse is sent out from the transmitting antenna and received upon the other receiving antenna. This process continues at a rapid rate. Mechanical commutation of antenna connections has been found desirable, which requires the use of a relatively low pulsing frequency for mechanical reasons. In order to maintain high accuracy of range determination, my invention is of particular importance here.

While the preferred embodiment of the invention described in detail refers to a directly indicating cathode-ray tube screen, it is of course understood that the idea of the invention may be carried out with other indicating devices, as a combination of pilot-lights, or a single pilot light flashing up in response to the correct position of the mechanical dial corresponding to the measured phase difference. Similarly any of the known methods using acoustic signals may be combined with the general methods of the invention.

What I claim is:

1. The method of radio range finding of a distant object utilizing a phase comparator which is controlled simultaneously by waves from a master oscillator transmitted therefrom over different paths one of which is a radio channel from the oscillator to and from the object to the comparator and the other of which is a channel from the oscillator to the comparator and wherein one of said paths includes a phase adjuster, which method includes the steps of subdividing the frequency of the oscillations from the master oscillator in both said paths to an integral submultiple of said master oscillation frequency, and adjusting the phase of the waves transmitted from the oscillator over at least one of said paths prior to said subdivision of frequency.

2. In a system of the character described, a master oscillator, a pair of paths leading from said oscillator, a visual indicator having a pair of coordinate controls for producing a visual indication in accordance with the relative phases between the signals applied to said controls, a local oscillator in one of said paths for exciting one of said controls, means in each of said paths for subdividing the master oscillation frequency therein, a phase adjuster in at least one of said paths between the master oscillator and the frequency subdivider, a device for synchronizing the frequency of said local oscillator with the output of the subdivider in the other path, and means to energize one of said controls by the signals in one path and means to energize the other of said controls by the signals in the said other path.

3. A system according to claim 2 including a radio transmitter and a radio receiver as part of one of said paths; a visual indicator in the form of a cathode ray tube oscilloscope with two deflection systems, a large amplitude sinusoidal local oscillator for controlling one of said deflection systems, and means for synchronizing the local oscillator at the instant when the scanning spot on the cathode ray tube screen passes an index mark on said screen.

4. In a system for range finding of distant objects employing a radio wave which is transmitted to and reflected from the object and in which the range is determined by the phase relation between the transmitted and reflected arriving wave, means to modulate the transmitted wave under control of a master oscillator by converting said master oscillations into a series of abrupt pulses having a frequency which is a submultiple of the master oscillator frequency, means to receive said pulses after reflection of the said transmitted wave from the object, a cathode-ray tube phase indicator, means to control one deflecting system of the cathode-ray tube by oscillations transmitted locally from the master oscillator, means to control the other deflecting system of the cathode-ray tube by said received pulses, and means to subdivide the frequency of said master oscillations before applying them to said one deflecting system.

5. The method of timing by transmitting oscillations from a master oscillator over two different paths containing frequency dividers and terminating in a visual signal producer for observing the phase difference between the two signals arriving over said paths; and including at least means for establishing a controllable amount of phase shift between the two respective signals at certain points along said paths, which method comprises subjecting the waves in one path to a phase adjustment with respect to the waves in the other path, then subjecting the waves in both paths to a frequency sub-division and subsequently subjecting said signal producer to the action of the subdivided waves arriving at said signal producer.

6. The method according to claim 5 in which the master oscillations are generated in substantially sinusoidal form and said sinusoidal waves are converted to corresponding waves with steep fronts prior to being subdivided in frequency, and applying said steep wave fronts to frequency dividers to change abruptly the conductive states of said frequency dividers in synchronism with the time of arrival of the first one out of a fixed integral number of said steep wave fronts.

7. The method according to claim 5 in which the frequency division in both paths is the same.

8. The method of timing according to claim 5 in which the leading or trailing edges of the sub-divided waves, or both, are converted into sharp pulses by pulse formers including the steps of generating a radio frequency carrier wave, and modulating said wave by said sharp pulses in one path and controlling one component of the movement of the visual signal producer by said sharp pulses in the other path.

9. A timing system comprising a phase comparator and a master oscillator whose output is fed to two different transmission paths each containing at least a frequency sub-divider; a controllable phase shifter in one of said paths between said master oscillator and said frequency subdivider, by which the oscillator signal can be phase shifted by a controllable amount before it is fed to the frequency sub-divider and means for coupling the output of a frequency sub-divider in each of said transmission paths to said phase comparator.

10. The timing system according to claim 9 in which the output voltage of the master oscillator is substantially sinusoidal and in which square wave shapers are added in both paths just ahead of the frequency dividers, said frequency dividers being of the type changing their state of conduction abruptly at the arrival of the first one of a fixed integral number of steep wave fronts.

11. The timing system according to claim 9 in which said divider circuits both divide by the same integral number.

12. A timing system according to claim 9 in which the phase comparator consists of a cathode ray tube oscilloscope comprising coordinate scanning circuits controlling its deflection fields, and in which the scanning pulse wave of one of said scanning circuits is synchronized with the output of the frequency divider in one of said paths by means of a discriminator.

13. The timing system according to claim 9 including a scanning system and in which the output of the divider in one of said paths is impressed on a discriminator, with means to compare its time with that of a signal derived from said scanning system and which adjusts the frequency of said scanning system so as to closely synchronize said scanning system with the output of said divider.

14. A timing system according to claim 9 in which said phase comparator consists of a current indicator in the plate circuit of a multiple grid tube normally biased to cut-off, and means to apply the signals from one of said paths to one grid of the tube and the signals from the other path to another grid of said tube.

15. A timing system according to claim 9 in which said phase comparator consists of a neon tube in the plate circuit of a multiple grid tube which is normally biased to cut-off, and means to apply the signals from one of said paths to one grid of the multiple grid tube and the signals from the other path to another grid of said multiple grid tube.

16. A timing system according to claim 9 in which said phase comparator consists of a micro-ammeter in the plate circuit of a multiple grid tube which is normally biassed to cut-off, and means to apply the signals from one of said paths to one grid of the multiple grid tube and the signals from the other path to another grid of said multiple grid tube.

17. A timing system according to claim 9 in which said phase comparator consists of a telephone receiver in the plate circuit of a multiple grid tube which is normally biassed to cut-off, and means to apply the signals from one of said paths to one grid of the multiple grid tube and the signals from the other path to another grid of said multiple grid tube.

18. In a radio range finder, a source of oscillation whose output is fed into two different paths, a frequency divider in each of said paths, a phase adjuster in one of said paths preceding the frequency divider in that path, a radio frequency transmitter which is modulated by the signals derived from the frequency divider in one of said paths, a radio receiver which picks up the waves transmitted from the modulated transmitter after reflection from an object whose range is to be determined, and a phase comparator located between the end of the other path and said radio receiver.

19. In a radio range finder according to claim 18, circuit means for producing substantially sinusoidal oscillations in said source of oscillations and wave shapers in each of said paths which convert the sinusoidal oscillations into waves with steep fronts before the signals arrive at the frequency dividers.

20. In a system according to claim 18, pulse formers in each path excited by the output of the frequency dividers; said phase comparator being formed by an oscilloscope having two coordinate deflecting systems, one of which is controlled by the signal picked up by the radio receiver, the other by the pulses formed by one of said pulse formers; and said phase adjuster in one of said paths being calibrated.

21. A system according to claim 18 in which square wave shapers are provided in each of said paths between said oscillator and the frequency sub-divider.

22. A system according to claim 18 in which each one of said frequency sub-dividers is of the type which changes its conductivity abruptly and synchronously with the application of the first one of an integral number of steep wave fronts.

23. A system according to claim 18 in which said source is a master oscillator for generating sinusoidal waves each path is provided with a device for converting the sinusoidal waves from the master oscillator into waves of the same frequency but with steep wave fronts, and in which the frequency sub-divider produces other waves with steep wave fronts but whose frequency is an integral sub-multiple of the master oscillator frequency.

24. In a system of the character described, a master oscillator, a pair of paths leading from said oscillator one of which includes a radio transmitter and a radio receiver; a visual indicator in the form of a cathode ray tube oscilloscope with two separate deflection systems for producing a visual indication in accordance with the relative phases between the signals applied to said deflection systems, a local oscillator in one of said paths for exciting one of said deflection systems, means in each of said paths for dividing the master oscillation frequency therein, a phase adjuster in at least one of said paths between the master oscillator and the frequency sub-divider, a device for synchronizing the frequency of said local oscillator with the output of the sub-divider in the other path, means to energize one of said deflection systems by the signals in one path, means to energize the other of said deflection systems by the signals in the said other path, the said phase adjusting means being located between the master oscillator and at least one of said frequency sub-dividers.

25. In a system for determining the time relation between a transmitted electrical pulse and a reflected electrical pulse, two signal channels, a comparatively high frequency stable oscillator connected to supply signal to said two signal channels, a frequency divider in one of said channels for dividing said high frequency to a comparatively low frequency to produce a comparatively low frequency signal, means for producing periodically recurring keying pulses in synchronism with said low frequency signal, a radio transmitter and means for keying said transmitter by said keying pulses, a frequency divider in the other of said channels for dividing said high frequency to said comparatively low frequency to produce a time reference signal, means for producing periodically recuring time-reference pulses in synchronism with said time reference signal, a phase-shifting device connected in one of said channels between the high-frequency oscillator and the frequency divider in said one channel, means for receiving the pulses radiated by said transmitter after they have been reflected, a utilization circuit, means for supplying the reflected pulses and the time-reference pulses to said utilization circuit, and means for adjusting said phase-shifting device whereby the time interval between a transmitted and a reflected pulse may be determined by said adjustment of said phase-shifting device.

References Cited in the file of this patent

UNITED STATES PATENTS

| | | |
|---|---|---|
| 2,143,035 | Smith | Jan. 10, 1939 |
| 2,207,267 | Plaistowe | July 9, 1940 |
| 2,248,549 | Schlesinger | July 8, 1941 |